United States Patent
Appleman et al.

(10) Patent No.: US 10,583,620 B2
(45) Date of Patent: Mar. 10, 2020

(54) TIRE UNIFORMITY CORRECTION USING MULTIPLE CORRECTION TRACKS

(71) Applicants: COMPAGNIE GENERALE DES ETABLISSEMENTS MICHELIN, Clermont-Ferrand (FR); Casey Scott Appleman, Greenville, SC (US); Verner Steve Nicholson, Greenville, SC (US)

(72) Inventors: Casey Scott Appleman, Greenville, SC (US); Verner Steve Nicholson, Greenville, SC (US)

(73) Assignee: Compagnie Generale des Establissements Michelin, Clermont-Ferrand (FR)

( * ) Notice: Subject to any disclaimer, the term of this patent is extended or adjusted under 35 U.S.C. 154(b) by 227 days.

(21) Appl. No.: 15/744,983

(22) PCT Filed: Jul. 19, 2016

(86) PCT No.: PCT/US2016/042906
§ 371 (c)(1),
(2) Date: Jan. 15, 2018

(87) PCT Pub. No.: WO2017/015263
PCT Pub. Date: Jan. 26, 2017

(65) Prior Publication Data
US 2018/0207893 A1 Jul. 26, 2018

(30) Foreign Application Priority Data
Jul. 22, 2015 (WO) ................ PCT/US2015/041477

(51) Int. Cl.
B29D 30/06 (2006.01)
B24B 49/04 (2006.01)
(Continued)

(52) U.S. Cl.
CPC ......... *B29D 30/0633* (2013.01); *G01M 17/02* (2013.01); *G01M 17/021* (2013.01);
(Continued)

(58) Field of Classification Search
CPC ........ B29D 30/0633; B29D 2030/0635; B29D 2030/0638; G01M 17/02;
(Continued)

(56) References Cited

U.S. PATENT DOCUMENTS 4,016,020 A * 4/1977 Ongaro ................... B24B 5/366
156/75
4,414,843 A * 11/1983 Kounkel ............. G01M 17/022
73/146
(Continued)

FOREIGN PATENT DOCUMENTS

WO WO 2010/080571 7/2010
WO WO 2011/002595 1/2011
(Continued)

OTHER PUBLICATIONS

Lesson 10: Unknown Length and Area Problems, Eureka Math, 2014; retrieved on Sep. 20, 2016 from http://greatminds.net/maps/images/mathdocuments/G10.M5.B.Lesson.10_Teacher_Materials.pdf; pp. 2, 9 and 10.
(Continued)

*Primary Examiner* — George B Nguyen
(74) *Attorney, Agent, or Firm* — Dority & Manning, P.A.

(57) ABSTRACT

Systems and methods for correcting uniformity of a cured tire using ablation of material along a plurality of tracks along the bead portion of the tire are provided. An ablation pattern can be determined to correct for a uniformity parameter for multiple tracks along a bead portion of a tire. The ablation pattern for each track can be analyzed to determined direct address commands for implementing the ablation
(Continued)

pattern using an ablation device. The direct address commands can be determined according to an adjustment process to improve cycle time for the ablation of a tire. The adjustment process can be operable to more closely align azimuthal positions of ablation segments specified by direct address commands for different tracks along the bead of the tire.

14 Claims, 8 Drawing Sheets

(51) Int. Cl.
  *G01M 17/02* (2006.01)
  *G05B 19/418* (2006.01)
(52) U.S. Cl.
  CPC .... *G05B 19/418* (2013.01); *B29D 2030/0635* (2013.01); *B29D 2030/0638* (2013.01)
(58) Field of Classification Search
  CPC .......... G01M 5819/418; G01M 17/024; B24B 49/04; B24B 49/165; B24B 37/013
  USPC .............................................................. 451/1
  See application file for complete search history.

(56) References Cited

U.S. PATENT DOCUMENTS

| | | | | |
|---|---|---|---|---|
| 5,144,996 | A * | 9/1992 | Kinuhata | B29D 30/68 157/13 |
| 5,478,126 | A * | 12/1995 | Laesch | E05C 19/06 292/87 |
| 5,537,866 | A * | 7/1996 | Bangert | G01M 17/024 451/242 |
| 6,908,587 | B1 * | 6/2005 | Balter | B29D 30/0633 264/235 |
| 2007/0084541 | A1 * | 4/2007 | Moriguchi | B29D 30/0061 156/117 |
| 2007/0144657 | A1 * | 6/2007 | Flament | B29D 30/0662 156/110.1 |
| 2007/0145623 | A1 * | 6/2007 | Hair, Jr. | B29D 30/0633 264/40.1 |
| 2012/0095587 | A1 * | 4/2012 | Hair, Jr. | G01M 17/024 700/110 |
| 2014/0379116 | A1 * | 12/2014 | Nicholson | B29D 30/0633 700/160 |
| 2015/0160652 | A1 | 6/2015 | Hair et al. | |
| 2016/0236430 | A1 | 8/2016 | Frelicot | |
| 2016/0236434 | A1 * | 8/2016 | Linne | B29D 30/32 |

FOREIGN PATENT DOCUMENTS

| | | |
|---|---|---|
| WO | WO 2013/095479 | 6/2013 |
| WO | WO 2014/084841 | 6/2014 |
| WO | WO 2014/085595 | 6/2014 |
| WO | WO 2015/047734 A1 | 4/2015 |

OTHER PUBLICATIONS

PCT International Search Report for PCT/US2016/042906, dated Sep. 20, 2016—11 pages.
PCT International Search Report for PCT/US2015/041477, dated Sep. 22, 2015—8 pages.
PCT International Preliminary Report on Patentability for corresponding PCT Application No. PCT/US2016/042906, dated Jan. 23, 2018—12 pages.
PCT International Preliminary Report on Patentability for corresponding PCT Application No. PCT/US2015/041477, dated Jan. 23, 2018—8 pages.
Extended European Search Report for corresponding PCT Application No. PCT/US2016/042906, dated Mar. 4, 2019, 8 pages.

\* cited by examiner

TIRE UNIFORMITY CORRECTION USING MULTIPLE CORRECTION TRACKS

PRIORITY CLAIM

The present application is a 371 of International Application Number PCT/US2016/042906 filed Jul. 29, 2016, which is a continuation of and claims priority to PCT/US15/41477, filed Jul. 22, 2015 in the United States Receiving Office, which is incorporated herein by reference.

FIELD

The present disclosure relates generally to systems and methods for improving tire uniformity, and more particularly to systems and methods for improving tire uniformity by selective removal of material along tire bead locations in a cured tire.

BACKGROUND

Tire non-uniformity relates to the symmetry (or lack of symmetry) relative to the tire's axis of rotation in certain quantifiable characteristics of a tire. Conventional tire building methods unfortunately have many opportunities for producing non-uniformities in tires. During rotation of the tires, non-uniformities present in the tire structure produce periodically-varying forces at the wheel axis. Tire non-uniformities are important when these force variations are transmitted as noticeable vibrations to the vehicle and vehicle occupants. These forces are transmitted through the suspension of the vehicle and may be felt in the seats and steering wheel of the vehicle or transmitted as noise in the passenger compartment. The amount of vibration transmitted to the vehicle occupants has been categorized as the "ride comfort" or "comfort" of the tires.

Tire uniformity characteristics, or attributes, are generally categorized as dimensional or geometric variations (radial run out (RRO) and lateral run out (LRO)), mass variance, and rolling force variations (radial force variation, lateral force variation and tangential force variation). Uniformity measurement machines often measure the above and other uniformity characteristics by measuring force at a number of points around a tire as the tire is rotated about its axis.

Once tire uniformity characteristics are identified, correction procedures may be able to account for some of the uniformities by adjustments to the manufacturing process. Some of the uniformities may be hard to correct during the manufacturing process and so additional correction procedures are needed to correct remaining non-uniformities of cured tires. A number of different techniques may be available, including but not limited to the addition and/or removal of material to a cured tire and/or deformation of a cured tire.

One known technique for correcting tire non-uniformities is the use of ablation along a bead portion of the tire. For instance, U.S. Patent Application Publication No. 2012/0095587, which is commonly assigned to the assignee of the present disclosure and which is incorporated by reference herein for all purposes, discloses the use of laser ablation along various tracks on the bead portion of a tire, such as along a bead seat zone, a lower flange zone, and an upper flange zone, of the tire. In particular, an ablation pattern for the tire beads is calculated to reduce the magnitude of one or more harmonics of at least one uniformity parameter. Material along the bead portion of the tire is then selectively removed using the calculated laser ablation pattern.

In some implementations, ablation of the bead of the tire can be performed using a plurality of direct address commands. The direct address commands can specify operating parameters for discrete ablation segments at specific azimuthal locations or "addresses" on the bead of the tire. More particularly, a desired ablation pattern can be broken down into a plurality of discrete ablation segments. These ablation segments represent small portions of the total ablation pattern that will be removed in incremental fashion by the ablation device. The direct address commands specify locations and other parameters for the plurality of discrete ablation segments to achieve a desired ablation pattern. U.S. Patent Application Publication No. 2014/0379116 which is commonly assigned to the assignee of the present disclosure and which is incorporated by reference herein for all purposes, discloses the use of direct address commands in selectively removing tire material from the bead portions of a tire.

SUMMARY

Aspects and advantages of embodiments of the present disclosure will be set forth in part in the following description, or may be learned from the description, or may be learned through practice of the embodiments.

One example aspect of the present disclosure is directed to a method of improving the uniformity of a cured tire. The method includes determining, by one or more computing devices, an ablation pattern for each of a plurality of tracks about a bead of a tire and determining, by the one or more computing devices, a plurality of direct address commands for each ablation pattern based at least in part on an adjustment process. Each direct address command specifies one or more ablation parameters for an ablation segment at an address along the bead of the tire. The adjustment process is operable to increase azimuthal overlap at an azimuthal location on the tire between two or more ablation segments associated with different tracks of the plurality of tracks along the bead of the tire. The method further includes selectively removing tire material from the bead of the tire based at least in part on the direct address commands.

Another example aspect of the present disclosure is directed to a uniformity correction system for improving the uniformity of a tire. The system includes a tire fixture on which a tire is configured to be securely mounted. The system further includes an ablation device configured to provide ablation of a tire mounted on the tire fixture. The ablation device is configured to rotate about the tire during ablation of the tire. The system further includes a control system coupled to the ablation device and to the tire fixture. The control system is configured to determine an ablation pattern for each of a plurality of tracks about a bead of the tire and to determine a plurality of direct address commands for each ablation pattern based at least in part on an adjustment process. Each direct address command specifies one or more ablation parameters for an ablation segment at an address along the bead of the tire. The adjustment process is operable to increase azimuthal overlap at an azimuthal location on the tire between two or more ablation segments associated with different tracks of the plurality of tracks along the bead of the tire. The control system is further configured to control the ablation device such that tire material is selectively removed from the bead of the tire based at least in part on the direct address commands.

These and other features, aspects and advantages of various embodiments will become better understood with reference to the following description and appended claims.

The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which:

FIG. 3 plots the desired ablation depth (D) along the ordinate and the angular location (0) around the bead of the tire along the abscissa.

FIG. 6 plots the vertical position (H) of the bitmap image along the abscissa and the ablation depth (D) along the ordinate.

DETAILED DESCRIPTION

Figure 1:
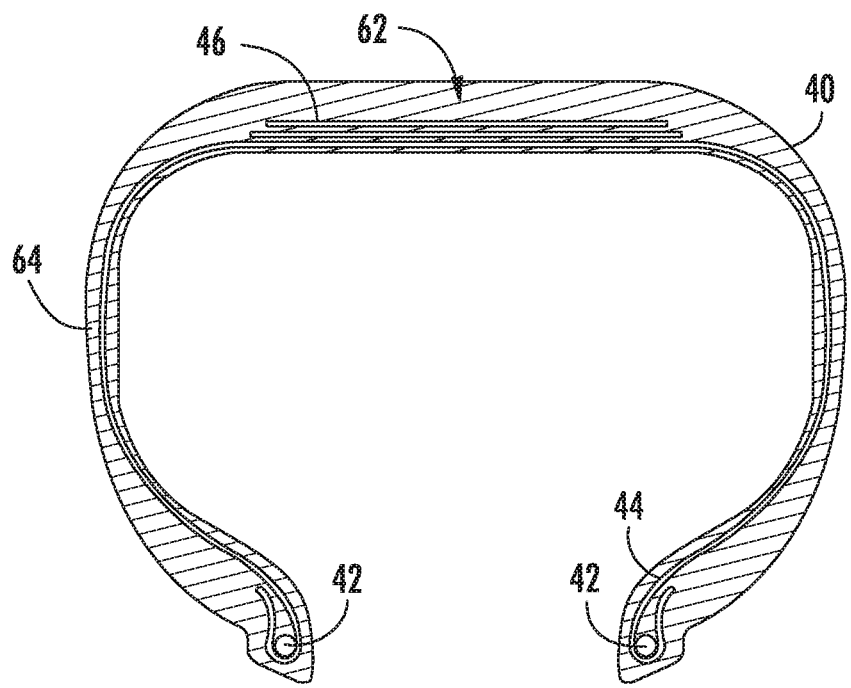
FIG. 1 is a cross-sectional view of a radial tire, which can be corrected according to example aspects of the present disclosure.

Reference now will be made in detail to embodiments, one or more examples of which are illustrated in the drawings. Each example is provided by way of explanation of the embodiments, not limitation of the invention. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Overview

Example aspects of the present disclosure are directed to systems and methods for improving the uniformity of a tire by selectively removing tire material from a plurality of different tracks along the bead portion of the tire. Tire uniformity correction can be accomplished by ablating one or more tracks along a bead portion of a tire using an ablation device, such as a laser ablation device. For instance, laser ablation techniques can be used to selectively remove tire material from one or more of a bead seat zone track, low flange zone track, or high flange zone track according to one or more ablation patterns calculated to improve tire uniformity.

Some ablation systems can use direct address commands to implement the ablation patterns along the plurality of tracks on the bead portion of the tire. Direct address commands can specify ablation parameters for discrete ablation segments to be performed at various azimuthal locations or addresses about the bead portion of the tire. When ablating the bead of the tire along multiple tracks, the pattern of ablation segments specified by the direct address commands can be different for each track as a result of each track being associated with a different radius. As a result, the ablation segments for each track may have slight azimuthal overlap with an ablation segment of a different track.

In some cases, the azimuths of ablation segments specified by the direct address commands for each of the different tracks may not coincide as a result of the ablation segments being calculated for tracks of different radii. As a result, a machine movement of the ablation device relative to the tire must occur between ablation segments when ablating different tracks. It can take a discrete amount of time for the ablation device to move and come to rest at a new azimuthal position. Thus, multiple movements of the ablation device in the azimuthal direction when implementing ablation patterns for multiple tracks can be costly for cycle time in correcting the uniformity of the tire.

According to example aspects of the present disclosure, the direct address commands can be determined according to an adjustment process to improve cycle time for the ablation of a tire. The adjustment process can be operable to more closely align azimuthal positions of ablation segments specified by direct address commands for different tracks along the bead of the tire. For instance, the adjustment process can be operable to increase overlap at an azimuthal location on the tire between two or more ablation segments associated with different tracks along the bead of the tire. In one embodiment, the adjustment process determines the direct address commands based at least in part on a standardized radius. In another embodiment, the adjustment process shifts the ablation segments to increase azimuthal overlap using, for instance, a matching function and/or one or more shift constraints.

In this way, the plurality of direct address commands can be determined such that two or more ablation segments can be ablated for two or more different tracks at the same or close to the same azimuthal location of the tire without requiring azimuthal movement of the ablation device relative to the tire. By reducing the required azimuthal movement of the ablation device between ablation segments on different tracks, the cycle time for correcting the uniformity of a tire can be improved.

Uniformity Correction by Ablation Along Selected Tracks of the Bead of the Tire

With reference now to the FIGS., example embodiments of the present disclosure will now be discussed in detail.

FIG. 1 provides a schematic illustration of a radial pneumatic tire 40 for uniformity correction in accordance with the present disclosure. The tire 40 is rotatable about a longitudinal central axis of rotation. The tire 40 includes a pair of bead wires 42 which are substantially inextensible in a circumferential direction. The first and second beads 42 are spaced apart in a direction parallel to the central axis. Circumferential is defined as being substantially tangent to a circle having its center at the axis and contained in a plane parallel to the mid-circumferential plane of the tire.

A carcass ply 44 extends between each of the respective beads 42. The carcass ply 44 has a pair of axially opposite end portions which extend around the respective bead 42. The carcass ply 44 is secured at the axially opposite end portions to the respective bead 42. The carcass ply 44 includes a plurality of substantially radially extending reinforcing members each of which are made of a suitable configuration and material, such as several polyester yarns or filaments twisted together. It will be apparent that the carcass ply 44 is illustrated as a single ply but may include any appropriate number of carcass plies for the intended use and load of the tire 40. It will also be apparent that the reinforcing member may be a monofilament or any other suitable configuration or material.

The tire 40 illustrated also includes a belt package 46. The belt package 46 includes at least two annular belts. One of the belts is located radially outwardly of the other belt. Each belt includes a plurality of substantially parallel extending reinforcing members made of a suitable material, such as a steel alloy. The tire 40 also includes rubber for the tread 62 and sidewalls 64. The rubber may be of any suitable natural or synthetic rubber, or combination thereof.

Figure 2:
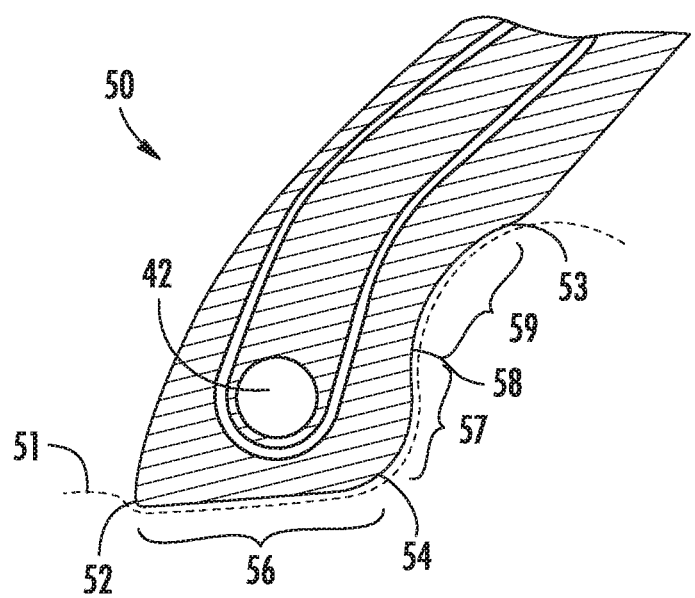
FIG. 2 depicts multiple track locations along the bead of the tire suitable for ablation to reduce the magnitude of selected tire uniformity parameters according to example aspects of the present disclosure.

FIG. 2 provides a magnified cross-sectional view of a tire bead, generally showing the various portions of such tire portion relative to its seated location on a wheel rim. For example, each tire bead area 50 includes a tire bead 42 and its surrounding rubber portions that are configured to define a bead profile as shown in FIG. 2. In general, the profile portion of the tire bead between toe 52 and an exit point 53 is fitted against a portion of a wheel rim for secure mounting. Dotted line 51 represents an example portion of a wheel rim against which tire bead area 50 may be secured for mounting. The bottom surface of the bead profile generally defined between toe 52 and heel 54 is referred to herein as the bead seat zone 56. The profile portion between heel 54 and exit point 53 is referred to generally as the flange, and includes a lower flange zone 57 between the heel and a flange transition point 58 and an upper flange zone 59 between the flange transition point 58 and the exit point 53.

As discussed in more detail below, the magnitude of selected uniformity parameters, including selected harmonics of uniformity parameters, can be reduced by selectively removing material along one or more tracks in the bead seat zone 56, lower flange zone 57, and/or upper flange zone 59 of the bead 50 of the tire. Tire uniformity characteristics that may be corrected generally include rolling force variations such as radial force variation and lateral force variation and even other parameters including but not limited to mass variance.

Figure 3:
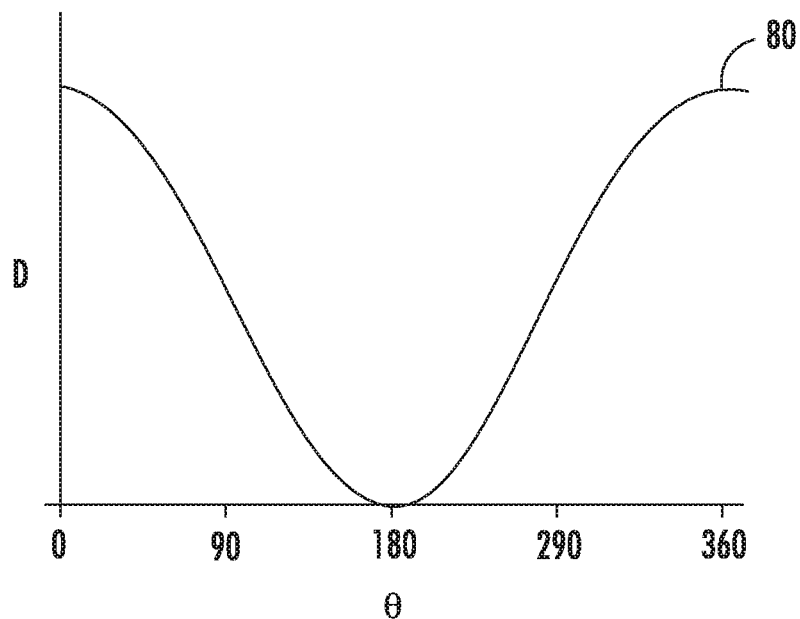
FIG. 3 depicts an example ablation pattern calculated to reduce the magnitude of selected tire uniformity parameters according to an example aspect of the present disclosure.

In accordance with aspects of the present disclosure, material from one or more tracks in the bead seat zone 56, lower flange zone 57, and/or upper flange zone 59 can be selectively removed according to a calculated ablation pattern. The calculated ablation pattern can specify an ablation depth as a function of azimuth about the tire. An example ablation pattern 80 is depicted in FIG. 3. As shown, the example ablation pattern 80 defines a desired ablation depth relative to an angular location (azimuth) around the bead of the tire. The ablation pattern 80 can be used to reduce, for instance, a first harmonic associated with a uniformity parameter, such as lateral force variation or radial force variation associated with a tire.

Once the ablation patterns for one or more of the tracks in the bead seat zone 56, lower flange zone 57, and/or upper flange zone 59 have been calculated, tire material can be selectively removed from the bead of the tire according to the calculated ablation pattern using a plurality of ablation techniques. For instance, in one embodiment, tire material can be selectively removed using laser ablation techniques. Laser ablation techniques can be preferable because it is able to accomplish removal of discrete ablation segments around the bead of the tire with precise control. To the extent that other rubber removal techniques, such as but not limited to grinding, sandblasting, water jet removal and the like may be implemented to achieve the same precision levels as laser ablation, the present subject matter may also employ such alternative removal techniques.

Figure 4:
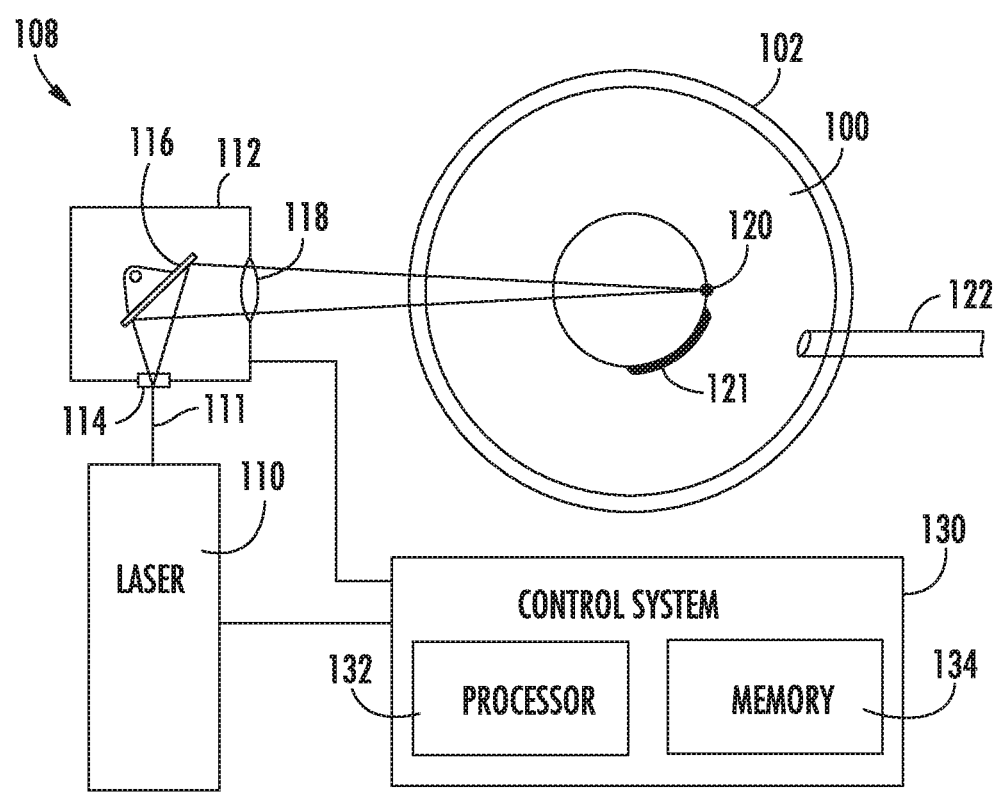
FIG. 4 depicts a block diagram of a system according to an example embodiment of the present disclosure.

FIG. 4 illustrates an example block diagram of a system for reducing identified uniformity parameters, such as radial force variation or lateral force variation, using laser ablation. As shown, a tire 100 is securely mounted to a mounting fixture 102, which generally serves as a stationary hub to hold the tire bead stationary relative to a laser ablation device 108. The laser ablation device 108 can selectively rotate about a tire held stationary by the mounting fixture 102 to achieve ablation along one or more tracks along the tire bead.

Laser ablation device 108 can include a laser 110, which can include a fixed-point or sheet-of-light laser system that outputs a laser beam 111 having a sufficient amount of power to perform selective removal of tire rubber material. In one particular example, laser ablation device 110 can include a carbon dioxide ($CO_2$) laser. After output by laser ablation device 110, laser beam 111 can be provided to a deflection element 112, which can include a beam splitter 114, deflector 116, imaging lens 118, and/or other optical elements. Imaging lens 118 focuses the illumination of the laser beam 111 to a focal point 120 on the tire 100 to remove rubber in an ablated area 121 along a tire bead. A vacuum 122 or other cleaning tool may be provided to extract any removed rubber or other waste from the ablation area. Additional outlets may provide a controlled output of gaseous medium (e.g., a nitrogen gas) to facilitate laser ablation and suppress potential flames at the ablation point.

The system of FIG. 4 is intended to illustrate laser ablation using a single laser and single focal point (i.e., removal at one tire bead at a time). However, it should be appreciated that multiple lasers be used to perform ablation at multiple focal points (e.g., at both tire beads). For instance, in a particular embodiment, a first laser can be used to independently provide ablation of a first tire bead and a second laser can be used to independently provide ablation of a second tire bead. Each of the first laser and the second laser can be independently rotated about a tire held in a fixed location by a tire fixture to achieve ablation along selected tracks for both the first and second tire beads.

As shown in FIG. 4, a computer control system 130 controls one or more components of laser ablation device 108 to achieve the desired ablation pattern along one or more tracks along the bead of the tire. The computer control system 130 can generally include such components as at least one memory/media element or database for storing data and software instructions as well as at least one processor. According to particular aspects of the present disclosure, the computer control system 130 can control the laser ablation device 108 to rotate relative to a fixed tire to achieve ablation along one or more tracks of the tire bead.

In the particular example of FIG. 4, a processor(s) 132 and associated memory 134 are configured to perform a variety of computer-implemented functions (i.e., software-based services). The memory 134 can store software and/or firmware in the form of computer-readable and executable instructions that will be implemented by the processor(s) 132. Memory 134 can also store data which is accessible by processor(s) 132 and which can be acted on pursuant to the software instructions stored in the memory 134. Memory 134 can be provided as a single or multiple portions of one or more varieties of computer-readable media, such as but not limited to any combination of volatile memory (e.g., random access memory (RAM, such as DRAM, SRAM, etc.) and nonvolatile memory (e.g., ROM, flash, hard drives, magnetic tapes, CD-ROM, DVD-ROM, etc.) or any other memory devices including diskettes, drives, other magnetic-based storage media, optical storage media and others.

According to aspects of the present disclosure, memory 134 can store instructions that when executed by the processor(s) 132 cause the processor(s) to perform operations. For instance, the instructions can cause the processor(s) 132 to perform operations to determine direct address commands according to an adjustment process according to example embodiments of the present disclosure.

In one particular implementation, the computer control system 130 can control the ablation of the bead of the tire according to the ablation patterns using a plurality of direct address commands. The direct address commands can specify operating parameters for discrete ablation segments at specific azimuthal locations or "addresses" on the bead of the tire. More particularly, the desired ablation pattern can be broken down into a plurality of discrete ablation segments. These ablation segments represent small portions of the total ablation pattern that will be removed in incremental fashion by the ablation device. The direct address commands specify locations and other parameters for the plurality of discrete ablation segments to achieve a desired ablation pattern.

Figure 5:
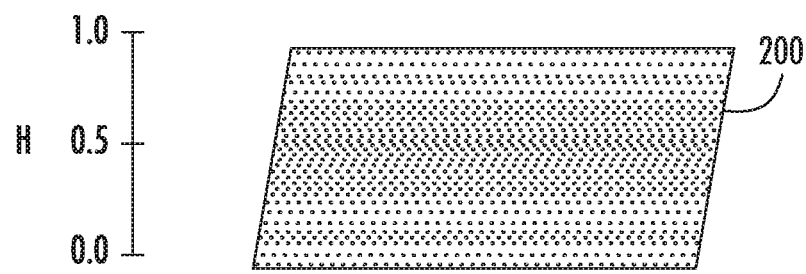
FIG. 5 illustrates an example ablation segment in the form of a grayscale bitmap image. The grayscale bit map image is plotted relative to the vertical position (H) of the bitmap image.

In a particular example, the ablation segments can be associated with a bitmap image which correlates the ablation depth along a specified track to a varied-tone graphic image (e.g., having color or grayscale variations) representative of such depths. Such varied-tone images can be interpreted by software control of the ablation device to produce desired ablation depths at specific angular locations on the bead of the tire. FIG. 5 shows an example grayscale bitmap image for a particular discrete ablation segment 200 that may be performed by a laser in accordance with some particular embodiments of the present invention. In such ablation segment, the lower dot density representative of lighter grayscale tones correspond to smaller ablation depths and higher dot density representative of darker grayscale tones correspond to larger ablation depths.

Figure 6:
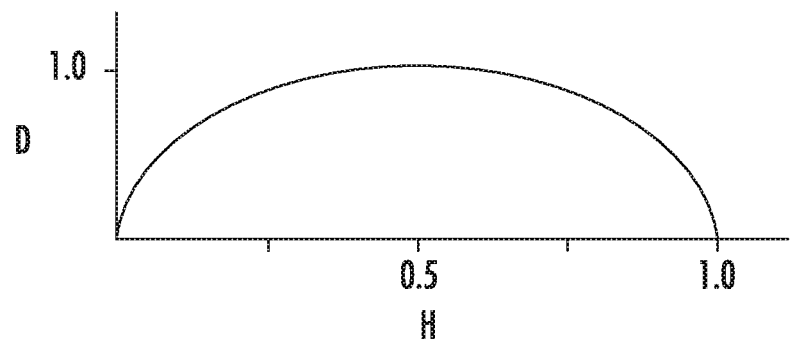
FIG. 6 provides a graphical illustration of ablation depth represented by the grayscale image of FIG. 5.

FIG. 6 provides a graphical example of the ablation depths represented by the dotted/grayscale image of FIG. 5. The highest dot density representing a darkest grayscale tone shown in FIG. 5 can correspond to an ablation depth of, for example 1 mm, such that the darkest portion of the image occurs around the middle of the vertical range from top to bottom of the bitmap image. The corresponding graph in FIG. 6 plots the vertical position of the bitmap image along the abscissa and the ablation depth (e.g., in mm) along the ordinate. As shown, the variation in ablation depth follows a generally smooth transitional curve as opposed to sharp contrasting regions.

Figure 7:
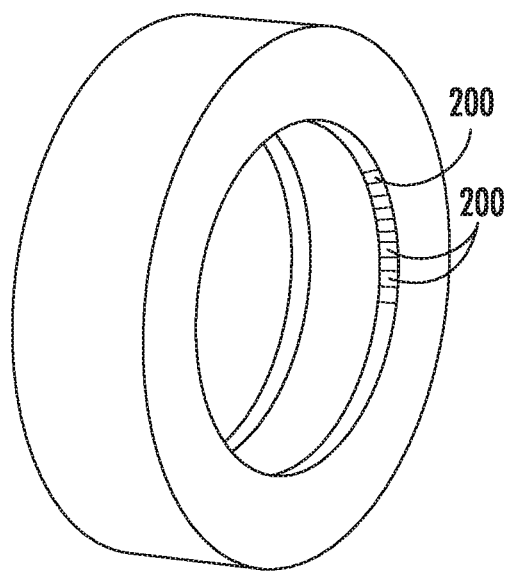
FIG. 7 provides a perspective view of multiple ablation segments removed along a tire bead.

FIG. 7 generally illustrates how multiple ablation segments 200 can be transposed along a bead surface. Although only a single row of ablation segments is illustrated along a tire bead, it should be appreciated that multiple rows and columns of such ablation patterns may exist to achieve the desired ablation pattern. Such groupings of ablation segments may also be correlated to more than one track along a tire bead. For example, one set of ablation segments may be translated from an ablation pattern determined for a track along a tire bead seat zone, while another set of ablation segments may be translated from an ablation pattern determined for a track along a lower flange zone, while yet another set of ablation segments may be translated from an ablation pattern determined for a track along an upper flange zone.

Figure 8:
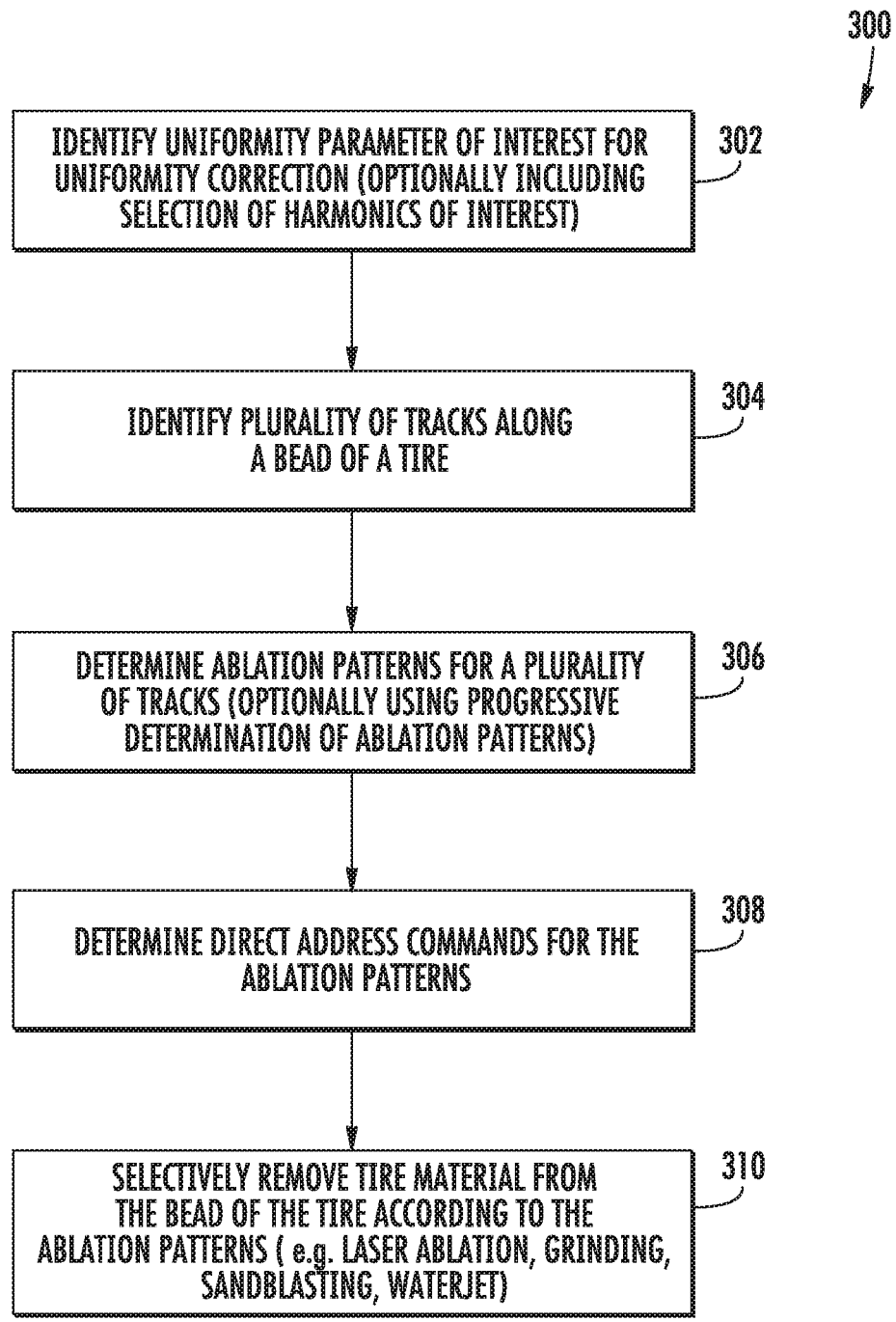
FIG. 8 depicts a flow diagram of an example method for correcting the uniformity of the tire according to example embodiments of the present disclosure.

Example Methods for Correcting One or More Uniformity Parameters of a Cured Tire FIG. 8 depicts an example method (300) for correcting the uniformity of a tire according example embodiments of the present disclosure. The method (300) can be implemented by any suitable tire ablation uniformity correction system, such as the system depicted in FIG. 4. In addition, FIG. 8 depicts steps performed in a particular order for purposes of illustration and discussion. Those of ordinary skill in the art, using the disclosures provided herein, will appreciate that various steps of any of the methods disclosed herein can be omitted, rearranged, combined, expanded, and/or adapted in various ways without deviating from the scope of the present disclosure.

At (302), the method includes identifying uniformity parameters of interest for uniformity correction. The uniformity parameters may optionally include one or more harmonics of interest. Tire uniformity parameters may generally include both dimensional or geometric variations (such as radial run out (RRO) and lateral run out (LRO)) as well as rolling force variations (such as radial force variation, lateral force variation and tangential force variation) and even other parameters including but not limited to mass variance, conicity, ply steer and the like.

Referring still to FIG. 1, the method at (302) may also optionally involve identification of harmonics to correct for each identified uniformity parameter of interest. In some embodiments, correction of selected identified harmonics (e.g., 1st, 2nd, 3rd and/or 4th harmonics) may be desired for the parameter(s) of interest. In other embodiments, correction of all harmonics may be desired by considering the complete cyclic, or composite waveform, of the uniformity parameter(s).

The identification of uniformity characteristics to correct may be determined in part by the results of uniformity testing performed on a manufactured tire. For example, a cured tire may be tested to determine whether the tire has radial and/or lateral force variations (and/or other characteristics) that fall within certain predetermined acceptable ranges for delivering the tire to a customer. If not, it may be possible to correct the uniformity characteristics of a tire in accordance with the example uniformity correction techniques according to aspects of the present disclosure.

At (304), the method includes identifying a plurality of tracks along a bead of the tire for selective removal of tire material to reduce the magnitude of the identified uniformity parameter. As discussed above, the magnitude of selected uniformity parameters, including selected harmonics of uniformity parameters, can be reduced by selectively removing material along one or more tracks in the bead portion of the tire, including at least one track in the high flange zone of the tire, at least one track in the low flange zone of the tire, and/or at least one track in the bead seat zone of the tire. FIG. 2 depicts the location of the high flange zone 59, the low flange zone 57, and the bead seat zone 56 along the bead of a tire 50.

Referring back to FIG. 8 at (306), the method includes determining an ablation pattern for each of the plurality of tracks along the bead of the tire to correct for tire uniformity. The ablation pattern can specify an ablation depth for removing tire material as a function of azimuth about the tire. The ablation depth for each azimuth can be calculated to correct for the identified uniformity parameter or harmonic of the uniformity parameter. In one embodiment, the ablation pattern can be a sinusoid having an amplitude and azimuthal location of maximum or peak magnitude.

In some embodiments, the ablation pattern for each of the plurality of tracks along the bead of the tire can be determined using progressive determination of ablation patterns. For instance, the one or more ablation patterns can be progressively determined according to a progression scheme defined by an ablation order identified for the plurality of tracks. The ablation order can define the order in which ablation patterns are determined (e.g., calculated) for the plurality of tracks. According to particular aspects of the present disclosure, the ablation order ranks the tracks based on sensitivity associated with the tracks such that ablation patterns are calculated for more sensitive tracks before ablation patterns are calculated for less sensitive tracks. The sensitivity of a track can provide a measure of the expected change in a uniformity parameter, such as lateral force variation or radial force variation, from implementing an ablation pattern along the track.

The progression scheme can include a plurality of stages, with each stage corresponding to one of the plurality of identified tracks for ablation. The progressive calculation of the ablation patterns according to the progression scheme can involve calculating a single ablation pattern for a single track at a time. In particular, for each stage in the progression scheme, an ablation pattern for a track selected from the ablation order can be calculated. After the ablation pattern for the single track has been calculated, the effect of the single ablation pattern can be used to estimate the remaining uniformity parameter resulting from the single ablation pattern. If the magnitude of the estimated uniformity parameter falls below a predetermined threshold, the method can exit the progression scheme. Otherwise, the method proceeds to the next stage of the progression scheme where this process is repeated until the estimated uniformity parameter magnitude falls below a threshold.

At (308), the method includes determining direct address commands for implementing the calculated ablation patterns for the plurality of tracks. More particularly, the ablation patterns can be segmented into a plurality of discrete ablation segments. The ablation segments are assigned to individual addresses at angular locations around the bead of the tire. A direct address command is generated for each discrete ablation segment. The direct address command specifies ablation parameters, such as ablation power, ablation scan rate, bit map, track on the bead of the tire, and/or other parameters for the ablation segment. The ablation device is then controlled to selectively remove tire material in discrete ablation segments at identified addresses pursuant to the direct address commands to achieve the desired ablation pattern.

According to example embodiments of the present disclosure, the direct address commands are determined according to an adjustment process. The adjustment process is operable to increase overlap at an azimuthal location on the tire between two or more ablation segments associated with different tracks along the bead of the tire. Example adjustment processes will be discussed in greater detail with reference to FIGS. 11-13 below.

Figure 9:
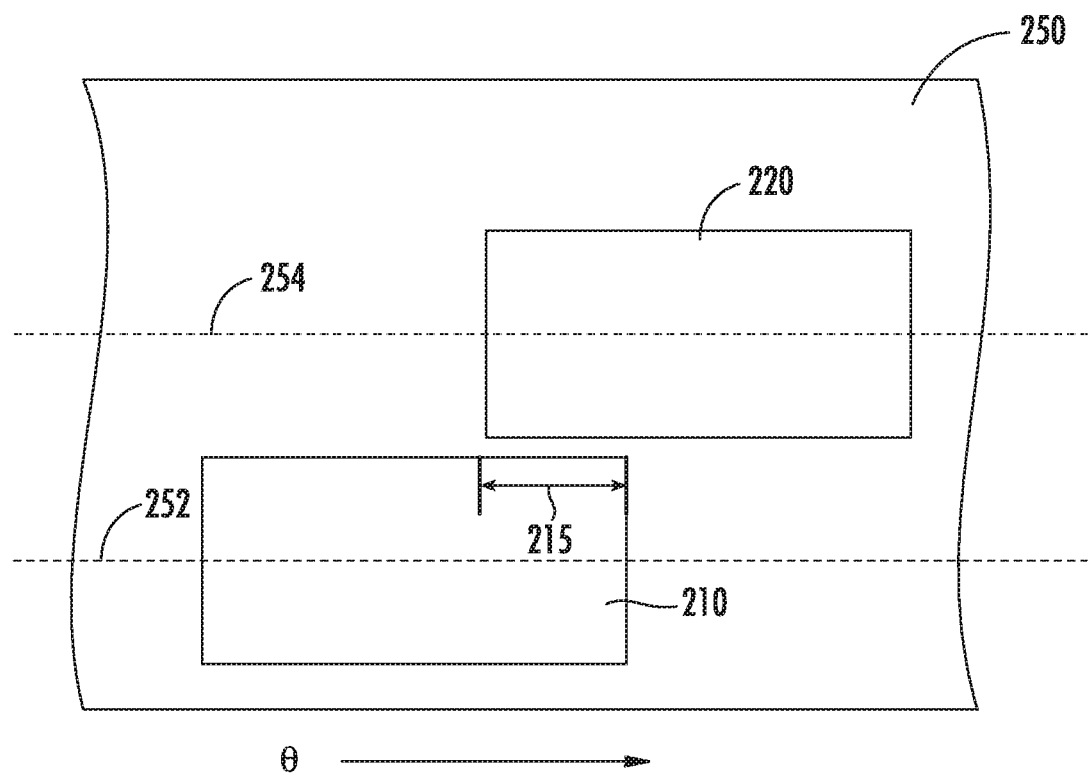
FIGS. 9-10 depict increasing the azimuthal overlap of ablation segments specified by direct address commands for different tracks according to example embodiments of the present disclosure.

FIG. 9 depicts a plurality of ablation segments 210 and 220 specified for ablation by direct address commands for two different tracks along the bead 250 of the tire. More particularly, ablation segment 210 is specified for a first track 252 and ablation segment 220 is specified for a second track 254. As shown, the ablation segment 210 and the ablation segment 220 have a small azimuthal overlap. This can result from, for instance, the different radii associated with the tracks 252 and 254 used to calculate the direct address commands. Because ablation segments 210 and 220 have small azimuthal overlap 215, a machine movement of the ablation device can be required to ablate the ablation segment 220 subsequent to ablation of the ablation segment 210. This machine movement can be costly for cycle time.

Figure 10:
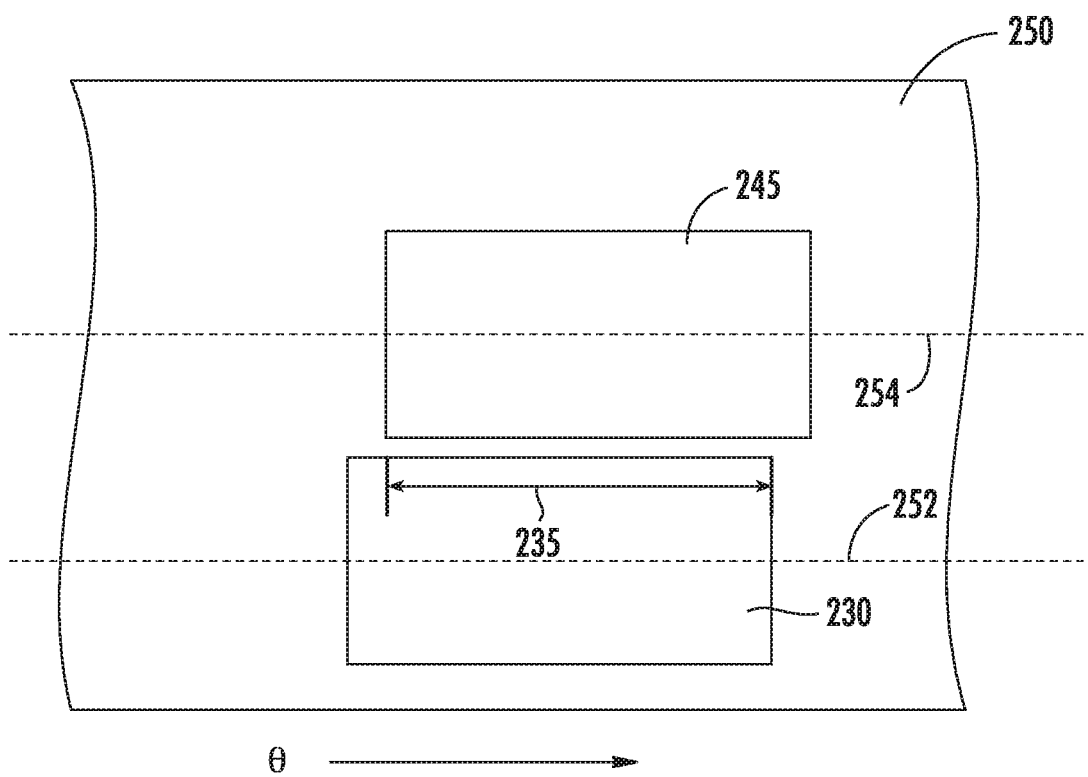

FIG. 10 depicts a plurality of ablation segments 230 and 245 specified for ablation by direct address commands determined according to example embodiments of the present disclosure. Ablation segment 230 is specified for the first track 252 and ablation segment 245 is specified for the second track 254. As shown, the azimuthal overlap 235 between ablation segment 230 and ablation segment 245 is significantly greater than the azimuthal overlap 215 of the ablation segments 210 and 220 shown in FIG. 9. As a result, machine movement of the ablation device may not be required to ablate the ablation segment 230 and 245, leading to reduced cycle time for correction of the uniformity of a cured tire.

At (310) of FIG. 8, selective removal of tire material at the one or more specified tracks/areas is accomplished in accordance with the direct address commands For instance, a laser ablation device can be rotated relative to a tire maintained in a fixed location to achieve ablation along one or more tracks of one or more beads of the tire. Laser ablation can be employed as a preferred removal technique because it is able to accomplish removal depths and areas with precise control. To the extent that other rubber removal techniques, such as but not limited to grinding, sandblasting, water jet removal and the like may be implemented to achieve the same precision levels as laser ablation, the present subject matter may also employ such alternative removal techniques.

Example Adjustment Process Based on Standardized Radius

In one embodiment, the direct address commands can be determined according to an adjustment process using a standardized radius (e.g. the same or uniform radius) of the plurality of tracks about the tire. Using a standardized radius, such as an average radius, to calculate the direct address commands for each track can lead to increased overlap in the azimuthal locations of ablation segments for different tracks specified by the direct address commands. Accordingly, ablation segments of different tracks can be more closely matched so that machine movement of the ablation device in the azimuthal direction may not be required to ablate the tire on multiple tracks at a particular azimuthal location.

Figure 11:
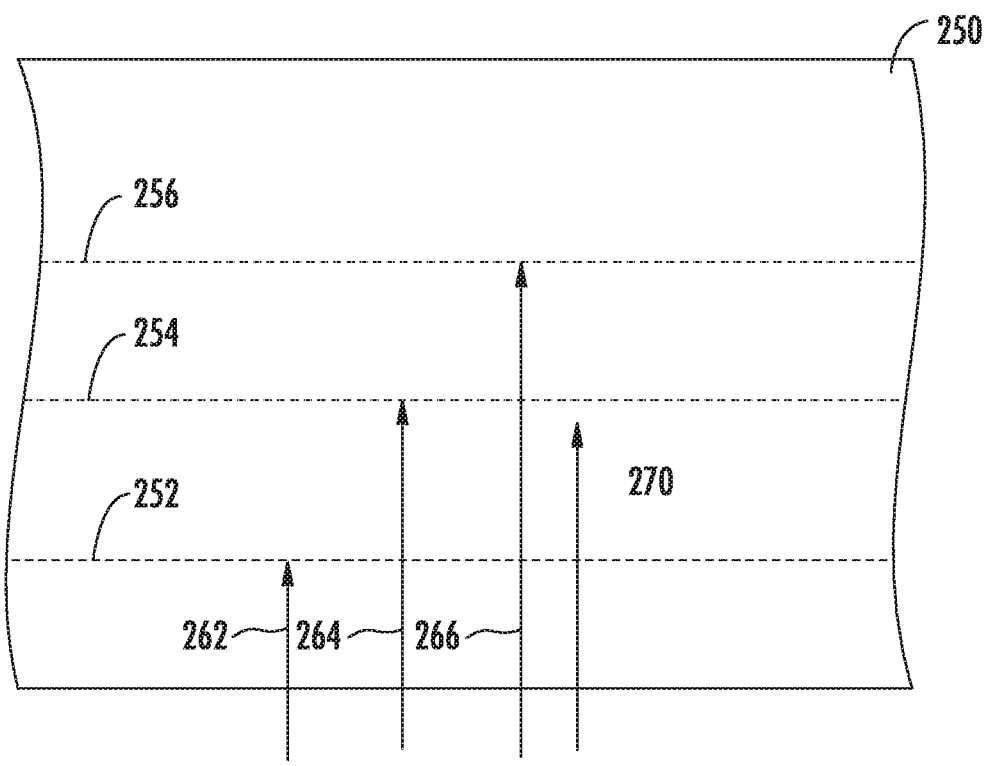
FIG. 11 depicts a representation of a plurality of tracks along a bead of a tire having different radii.

For instance, FIG. 11 depicts a portion of a bead 250 of a tire. As shown, the bead 250 has a plurality of tracks, including a first track 252, a second track 254, and a third track 256. In one embodiment, the first track 252 can be a bead seat zone track. The second track 254 can be a low flange zone track. The third track 256 can be a high flange zone track. As illustrated, each of the tracks includes a different radius relative to a center portion of a tire. The center of the tire refers to the point (not actually located on the tire) about which a tire would rotate when mounted on a tire fixture, rim, or other device. The first track 252 has a radius 262 from the center of the tire. The second track 254 has a radius 264 from the center of the tire. The third track 256 has a radius 266 from the center of the tire.

Calculating direct address commands for tracks of different radii can lead to ablation segments having different azimuthal locations. For instance, when a track along the bead of a tire is segmented into a plurality of addresses, the azimuth location of those addresses can be dependent on the radius of the track as the greater the radius, the greater number of ablation segments are required to ablate 360° around the tire. Using a standardized radius for the calculation of ablation segments for each track can result in the same or similar number of ablation segments for each track, leading to increased azimuthal overlap.

Figure 12:
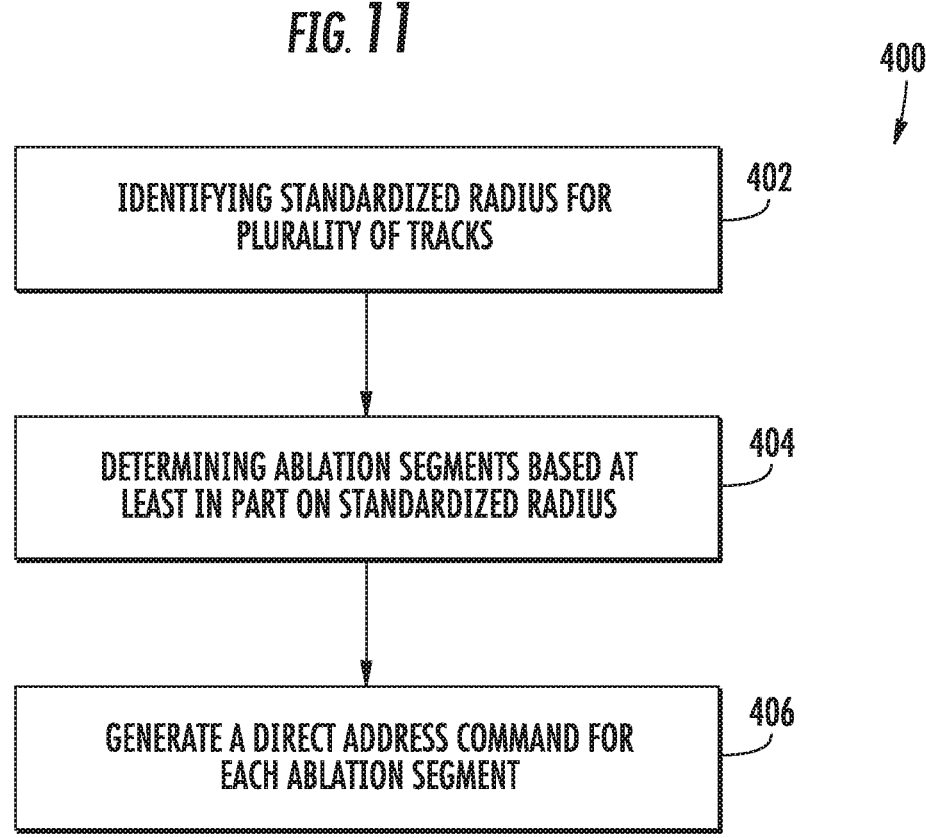
FIG. 12 depicts a flow diagram of an example adjustment process according to example embodiments of the present disclosure.

FIG. 12 depicts a flow diagram of an example adjustment process (400) for calculating direct address commands using a standardized radius according to example embodiments of the present disclosure. At (402), the method includes identifying a standardized radius for the plurality of tracks. For instance, an average radius (e.g. radius 270 of FIG. 11) can be used to calculate the direct address commands. The average radius can be a mean, median, or other suitable average radius.

At (404), a plurality of ablation segments can be determined based at least in part on the average radius and an ablation width associated with the ablation segments. For instance, the azimuth of the tire can be segmented into a plurality of ablation segments based at least in part on the azimuthal span of the ablation segment and the azimuthal span of the track as determined by the standardized radius. More particularly, the azimuthal span of the track as determined by the standardized radius can be segmented into the plurality of ablation segments based on the azimuthal width associated with each ablation segment. The azimuthal location of each ablation segment can then be rounded to a nearest value (e.g. nearest ¹⁄₁₀ of a degree). The ablation segments can be assigned to individual addresses at azimuthal locations around the bead of the tire.

In particular embodiments, multiple layers of ablation segments can be determined to achieve a desired ablation depth. For instance, in one implementation, ablation segments can be determined based on an average radius for a first ablation layer. An ablation segment depth can then be subtracted from the ablation pattern to achieve an adjusted ablation pattern. Ablation segments can be then determined based on the average radius for a second ablation layer. The process can repeat itself until a plurality of ablation layers for ablation segments are determined to achieve the desired ablation depth specified by the ablation pattern.

At (406), the method can include generating a direct address command for each ablation segment. The direct address command can specify an ablation power, ablation scan rate, ablation depth, and/or azimuthal location (e.g. address) of the ablation segment. The direct address commands can be stored in a memory device for later access by the ablation device in selectively removing tire material from a bead portion of a cured tire.

Example Adjustment Process Based on Azimuthal Shifting Using Matching Process

In another embodiment, the adjustment process can determine the plurality of ablation segments for each ablation pattern associated with the plurality of tracks and shifting at least one of the ablation segments in the azimuthal direction to increase azimuthal overlap with an ablation segment on a different track. In particular embodiments, the at least one ablation segment can be shifted based at least in part on a matching function. The matching function can determine a shift of each of the plurality of ablation segments based at least in part a sum of changes in azimuthal position of the plurality of ablation segments. In one embodiment, the ablation segment can be shifted based at least in part on a shifting constraint specifying a threshold azimuthal shift for an ablation.

Figure 13:
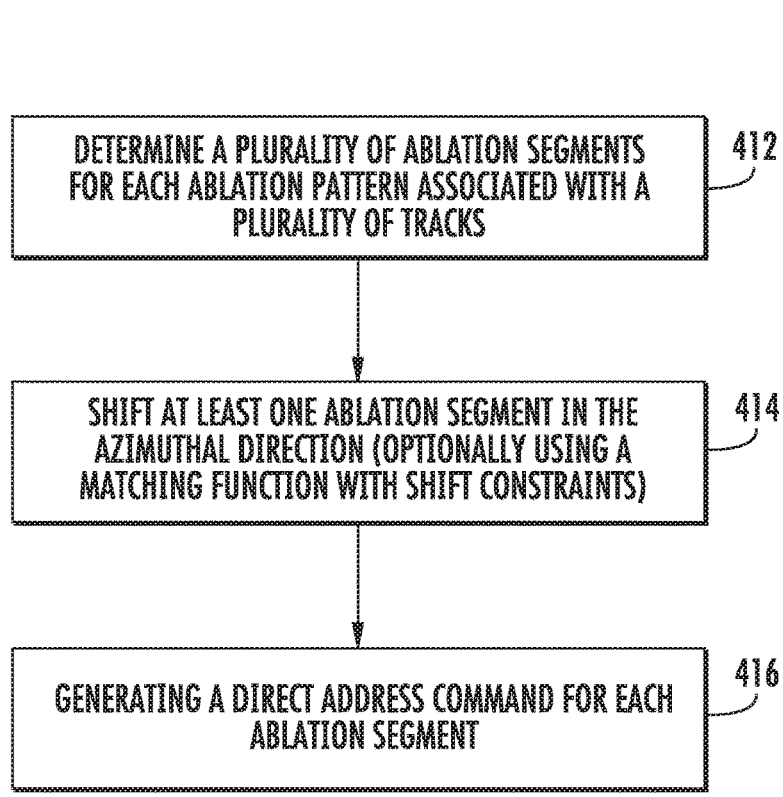
FIG. 13 depicts a flow diagram of an example adjustment process according to example embodiments of the present disclosure.

FIG. 13 depicts a flow diagram of an example adjustment process (410) for calculating direct address commands according to example embodiments of the present disclosure. At (412), a plurality of ablation segments can for each ablation pattern can be determined. As discussed above, the azimuth of each track can be segmented into a plurality of ablation segments based at least in part on the azimuthal span of the ablation segment and the azimuthal span of the track. The ablation segments can be assigned to individual addresses at azimuthal locations around the bead of the tire. In particular embodiments, multiple layers of ablation segments can be determined to achieve a desired ablation depth as discussed above.

Once the ablation segments for the different tracks have been determined, at least one ablation segment can be shifted in the azimuthal direction to increase the azimuthal overlap between ablation segments associated with different tracks (414). For instance, as shown in FIG. 10, the ablation segment 230 can be shifted in the azimuthal direction (θ) so that there is increased azimuthal overlap 235 between the ablation segment 230 and the ablation segment 245.

In one embodiment, at least one ablation segment can be shifted based at least in part on a matching function. The matching function can be a multivariate function that considers the position of all ablation segments as a result of shifting the position of at least one of the plurality of ablation segments. For instance, the matching function can define the possibility of a shift of one or more of the ablation segments based at least in part a sum of changes in azimuthal position of the plurality of ablation segments determined for the plurality of tracks. The matching function can be optimized (e.g. using various optimization techniques) to identify shifts in one or more of the ablation segments to increase azimuthal overlap in the ablation segments of different tracks while reducing the overall shift in the azimuthal position of the plurality of ablation segments.

In particular implementations, one or more shift constraints can be implemented in shifting one or more ablation segments to increase azimuthal overlap between ablation segments associated with different tracks. In one embodiment, the shift constraint can specify a maximum azimuthal movement of the ablation segment such that a discrete ablation segment cannot be shifted in the azimuthal direction by more than the shift constraint. In another embodiment, the shift constraint can implemented as part of the matching function. For instance, the shift constraint can be implemented as part of the matching function so that a proposed shift in an azimuthal segment cannot result in a drop in individual azimuthal overlap between ablation segments below a threshold, such as below 5% azimuthal overlap.

At (416), the method can include generating a direct address command for each ablation segment. The direct address command can specify an ablation power, ablation scan rate, ablation depth, and/or azimuthal location (e.g. address) of the ablation segment. The direct address commands can be stored in a memory device for later access by the ablation device in selectively removing tire material from a bead portion of a cured tire.

Simulation Results

A simulation was conducted to determine the difference in cycle time between ablation using direct address commands determined using an adjustment process according to example aspects of the present disclosure and ablation using direct address commands determined without using an adjustment process. The simulation applies a full power ablation pattern associated with a first harmonic on each of the bead seat zone track, low flange zone track, and high flange zone track.

Figure 14:
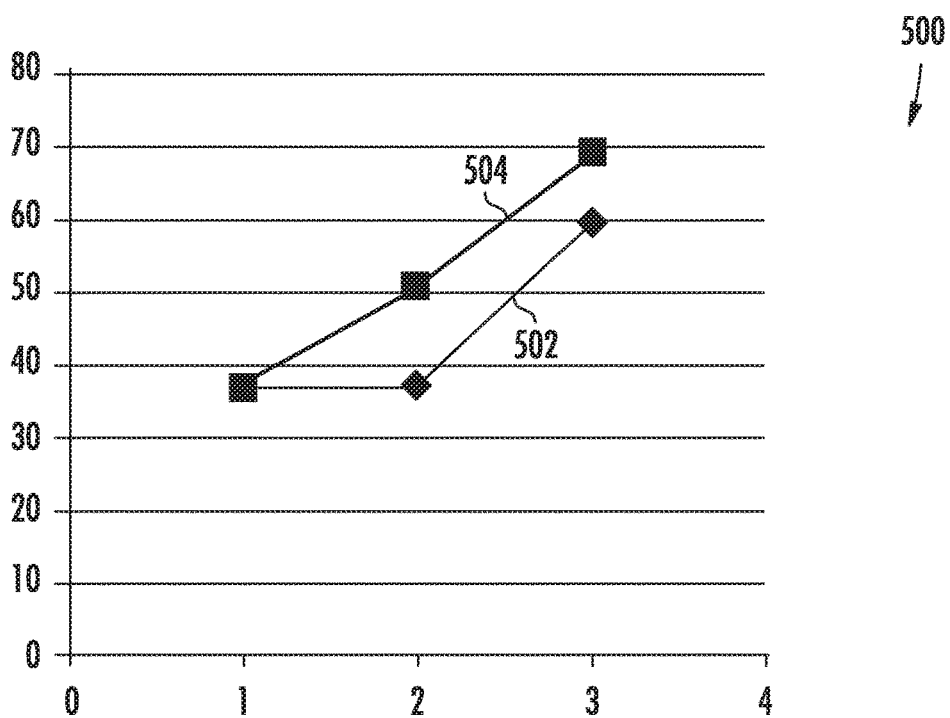
FIGS. 14-16 depict example simulation results according to example embodiments of the present disclosure.

FIG. 14 depicts a graphical representation 500 of simulation results between cycle time for ablation according to direct address commands determined using an adjustment process based at least in part on a standardize radius and cycle time for ablation according to direct address commands determined without an adjustment process. FIG. 14 plots the number of tracks ablated along the abscissa and cycle time in seconds along the ordinate. The cycle time for two tracks considers ablation on the high flange zone track and bead seat zone track. The cycle time for three tracks considers ablation on the high flange zone track, low flange zone track, and bead seat zone track. The high point for the ablation pattern on the low flange zone track is 180° out of phase from the high point for the ablation pattern on the bead seat zone track and the high flange zone track.

Curve 504 represents cycle time for ablation using direct address commands determined without an adjustment process. Curve 502 represents cycle time for ablation using direct address commands determined using a standardized radius. As shown, the cycle time is improved when ablating multiple tracks according to direct address commands determined using the adjustment process according to example aspects of the present disclosure.

Figure 15:
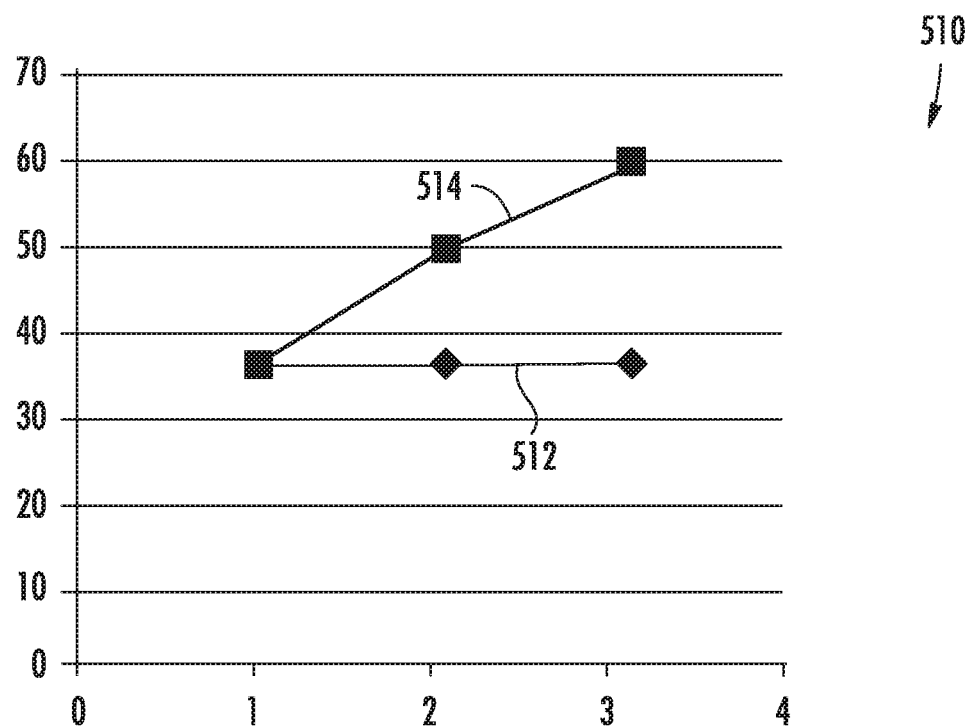

FIG. 15 depicts a graphical representation 510 of simulation results between cycle time for ablation using direct address commands determined using an adjustment process based at least in part on a standardized radius and cycle time for ablation using direct address commands determined without an adjustment process. FIG. 15 plots number of tracks ablated along the abscissa and cycle time in seconds along the ordinate. The cycle time for two tracks considers ablation on the high flange zone track and bead seat zone track. The cycle time for three tracks considers ablation on the high flange zone track, low flange zone track, and bead seat zone track. The high point for the ablation pattern for all three tracks is in the same azimuthal location.

Curve 514 represents cycle time for ablation according to direct address commands determined without an adjustment process. Curve 512 represents cycle time for ablation according to direct address commands determined using an adjustment process based at least in part on a standardized radius. As shown, the cycle time is improved when ablating multiple tracks using direct address commands determined using the adjustment process according to example aspects of the present disclosure.

Figure 16:
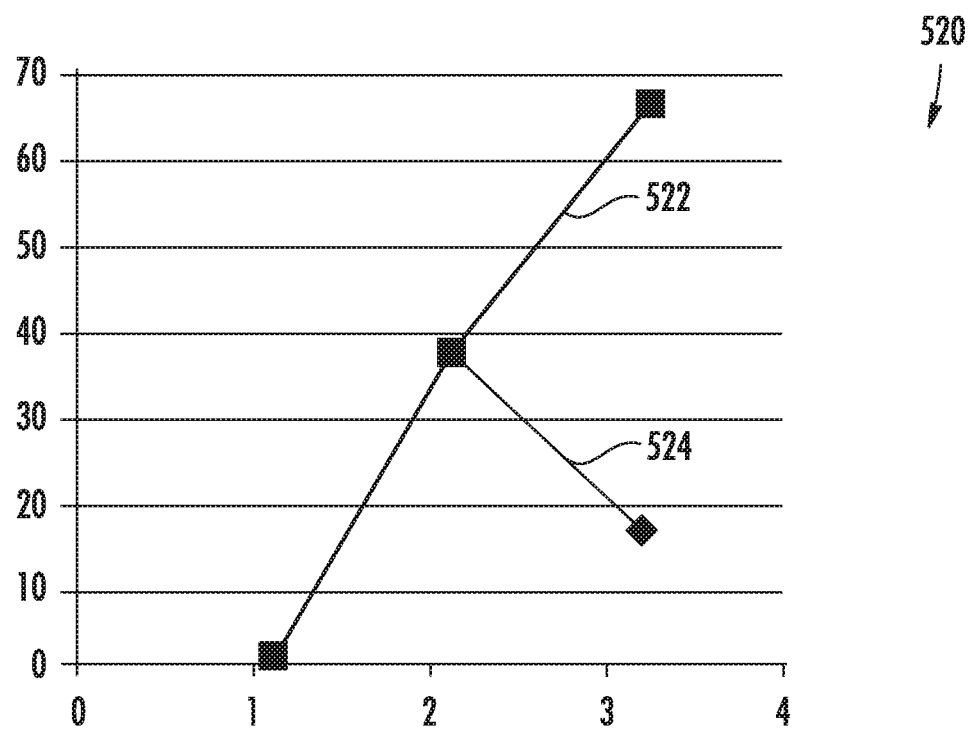

FIG. 16 depicts a graphic representation 520 of percentage improvement in cycle time for adjustment processes according to example embodiments of the present disclosure. FIG. 16 plots number of tracks along the abscissa and percentage improvement in cycle time along the ordinate. Curve 522 depicts percentage improvement for an adjustment process based on a standardized radius according to example aspects of the present disclosure when the high point for the ablation pattern for all three tracks is in the same azimuthal location. Curve 524 depicts percentage improvement for an adjustment process based at least in part on a standardized radius when the high point for the ablation pattern on the low flange zone track is 180° out of phase from the high point for the ablation pattern on the bead seat zone track and the high flange zone track.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method for improving the uniformity of a cured tire, comprising:
   determining, by one or more computing devices, an ablation pattern for each of a plurality of tracks about a bead of a tire;
   determining, by the one or more computing devices, a plurality of direct address commands for each ablation pattern based at least in part on an adjustment process, each direct address command specifying one or more ablation parameters for an ablation segment at an address on the bead of the tire, the adjustment process operable to increase azimuthal overlap at an azimuthal location on the tire between two or more ablation segments associated with different tracks of the plurality of tracks along the bead of the tire; and
   selectively removing tire material from the bead of the tire based at least in part on the direct address commands.

2. The method of claim 1, wherein the plurality of direct address commands are determined according to an adjustment process such that two or more ablation segments can be ablated for two or more different tracks at the azimuthal location of the tire without requiring azimuthal movement of the ablation device relative to the tire.

3. The method of claim 1, wherein determining, by the one or more computing devices, a plurality of direct address commands according to an adjustment process comprises determining a plurality of direct address commands for each ablation pattern based at least in part on a standardized radius of the plurality of tracks.

4. The method of claim 3, wherein the standardized radius comprises an average radius of the plurality of tracks.

5. The method of claim 4, wherein determining, by the one or more computing devices, a plurality of direct address commands for each ablation pattern based at least in part on a standardized radius of the plurality of tracks comprises:
   identifying, by the one or more computing devices, an average radius for the plurality of tracks;
   determining, by the one or more computing devices, a plurality of ablation segments based at least in part the average radius and an ablation width associated with the ablation segments; and generating, by the one or more computing devices, a direct address command for each ablation segment.

6. The method of claim 1, wherein determining, by the one or more computing devices, a plurality of direct address commands according to an adjustment process comprises:
   determining, by the one or more computing devices, a plurality of ablation segments for each ablation pattern associated with the plurality of tracks;
   shifting, by the one or more computing devices, at least one of the ablation segments in the azimuthal direction to increase azimuthal overlap with an ablation segment determined for a different track; and
   generating, by the one or more computing devices, a direct address command for each ablation segment.

7. The method of claim 6, wherein the at least one ablation segment is shifted based at least in part on a matching function, the matching function defining a shift of one or more of the plurality of ablation segments based at least in part a sum of changes in azimuthal position of the plurality of ablation segments.

8. The method of claim 7, wherein the at least one ablation segment is shifted based at least in part on a shifting constraint, the shifting constraint specifying a threshold azimuthal shift for an ablation segment.

9. The method of claim 1, wherein the plurality of tracks comprises at least one track in an upper flange zone of the bead, at least one track in the low flange zone of the bead, and at least one track in the bead seat zone of the bead.

10. The method of claim 1, wherein determining, by one or more computing devices, an ablation pattern for each of a plurality of tracks about a bead of a tire comprises progressively determining, by the one or more computing devices, the plurality of ablation patterns according to a progression scheme based at least in part on a determined ablation order for the plurality of tracks.

11. The method of claim 1, wherein selectively removing material from the bead of the tire in accordance with the one or more ablation patterns comprises selectively removing material from the tire using an ablation device configured to rotate around the tire while the tire is maintained in a fixed position.

12. A uniformity correction system for improving the uniformity of a cured tire, the system comprising:
   a tire fixture on which a tire is configured to be securely mounted;
   an ablation device configured to provide ablation of a tire mounted on said tire fixture, said ablation device configured to rotate about the tire during ablation of the tire; and
   a control system, said control system configured to determine an ablation pattern for each of a plurality of tracks about a bead of the tire and to determine a plurality of direct address commands for each ablation pattern based at least in part on an adjustment process, each direct address command specifying one or more ablation parameters for an ablation segment at an address along the bead of the tire, the adjustment process operable to increase azimuthal overlap at an azimuthal location on the tire between two or more ablation segments associated with different tracks of the plurality of tracks along the bead of the tire;
   wherein said control system is further configured to control the ablation device such that tire material is selectively removed from the bead of the tire based at least in part on the direct address commands.

13. The uniformity correction system of claim 12, wherein the control system is configured to determine a plurality of direct address commands based at least in part on a standardized radius of the plurality of tracks.

14. The uniformity correction system of claim 12, wherein the control system is configured to determine a plurality of direct address commands by performing operations, the operations comprising:
   determining a plurality of ablation segments for each ablation pattern associated with one of the plurality of tracks;
   shifting at least one of the ablation segments to increase azimuthal overlap with an ablation segment determined for a different track; and
   generating a direct address command for each ablation segment.

* * * * *